(12) United States Patent
Valenzuela et al.

(10) Patent No.: US 6,183,206 B1
(45) Date of Patent: Feb. 6, 2001

(54) MAGNETOHYDRODYNAMICALLY-DRIVEN COMPRESSOR

(75) Inventors: Javier A. Valenzuela, Hanover; Stacy W. Dodd, Etna, both of NH (US)

(73) Assignee: The United States of America as represented by the Secretary of the Air Force, Washington, DC (US)

( * ) Notice: Under 35 U.S.C. 154(b), the term of this patent shall be extended for 0 days.

(21) Appl. No.: 09/307,476

(22) Filed: May 10, 1999

(51) Int. Cl.$^7$ .............................. H02R 44/08; F04F 11/00
(52) U.S. Cl. .................. 417/50; 417/92; 417/103
(58) Field of Search ..................... 417/48, 50, 322, 417/92, 99, 103

(56) References Cited

U.S. PATENT DOCUMENTS

| | | | |
|---|---|---|---|
| 2,756,678 | * 7/1956 | Collins | 417/50 |
| 3,115,837 | * 12/1963 | Campana | 417/50 |
| 4,749,890 | * 6/1988 | Houston | 310/11 |
| 4,824,329 | * 4/1989 | Yamamoto et al. | 417/50 |

* cited by examiner

Primary Examiner—Charles G. Freay
(74) Attorney, Agent, or Firm—Thomas C. Stover

(57) ABSTRACT

A duct is provided having a flattened portion containing a liquid slug of gallium, and a magnetic field is passed through the gallium while an alternating current is also passed through the gallium to produce back and forth motion of the liquid gallium slug in step with the alternating current, enabling compression of working fluid within the duct.

21 Claims, 2 Drawing Sheets

MAGNETOHYDRODYNAMICALLY-DRIVEN COMPRESSOR

STATEMENT OF GOVERNMENT INTEREST

This invention may be made by or for the Government for governmental purposes without the payment of any royalty thereon.

BACKGROUND OF THE INVENTION

There is a need for a noni-contaminiating, high pressure ratio compressor for use in miniature J-T crycoolers, which potentially offer excellent devices for sensor cooling applications in space. A weak link in present J-T coolers is the compressor, which should produce high pressure ratios of 10–30, and operate reliably over extended periods. Also, the working compressor fluid must remain ultra-clean, while commercially available high pressure ratio compressors are typically oil flooded, and require extensive cleanup of the gas stream. Although sorption compressors may provide a source of clean high pressure gas for space J-T coolers, they have relatively low efficiencies and high mass. Additionally, in sensor cooling applications, the mass flow working fluid rates could be very small, thus calling for miniaturization of the compressor components,

BRIEF SUMMARY OF THE PREFERRED EMBODIMENT OF THE INVENTION

Accordingly, the invention provides a mag, nletohydrodyniamiiic compressor which can achieve high pressure ratios in a compact package without contaminating the working fluid, which can be helium gas. Compression is provided by applying a magnetic field to a liquid slug of liquid gallium and passing an alternating current through the liquid slug transverse to the magnetic field to produce back and forth motion of the liquid slug so that it operates as a piston between high and low pressure working fluid portions of the chamber containing the liquid slug. Diaphrams can be beneficially provided to separate the liquid slug from the working fluid.

BRIEF DESCRIPTION OF THE DRAWINGS

The various features of the invention will become more apparent upon study of the following description, taken in conjunction with the drawings in which.

DETAILED DESCRIPTION OF PREFERRED EMBODIMENTS OF THE INVENTION

Figure 1:
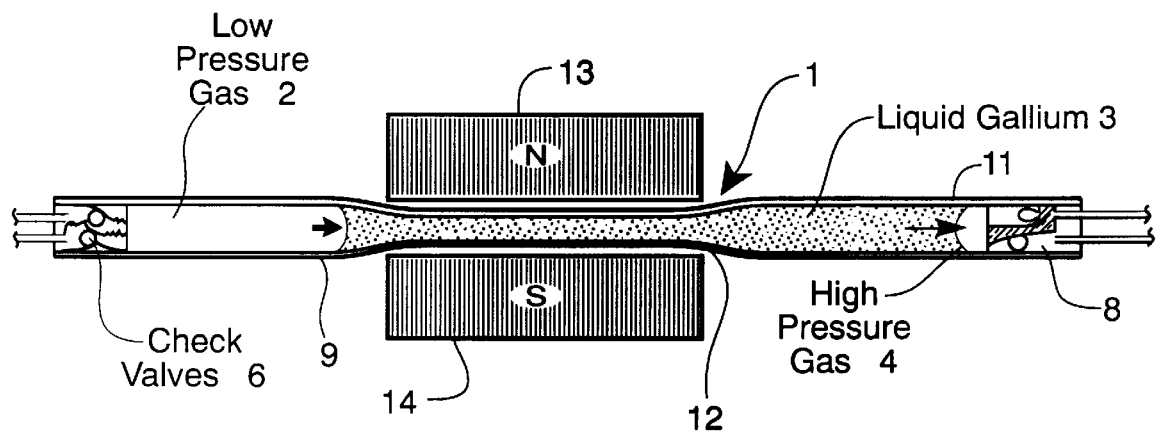
FIGS. 1 and 2 illustrate a preferred embodiment of the invention, FIG. 2 being an exploded perspective view.
Figure 2:
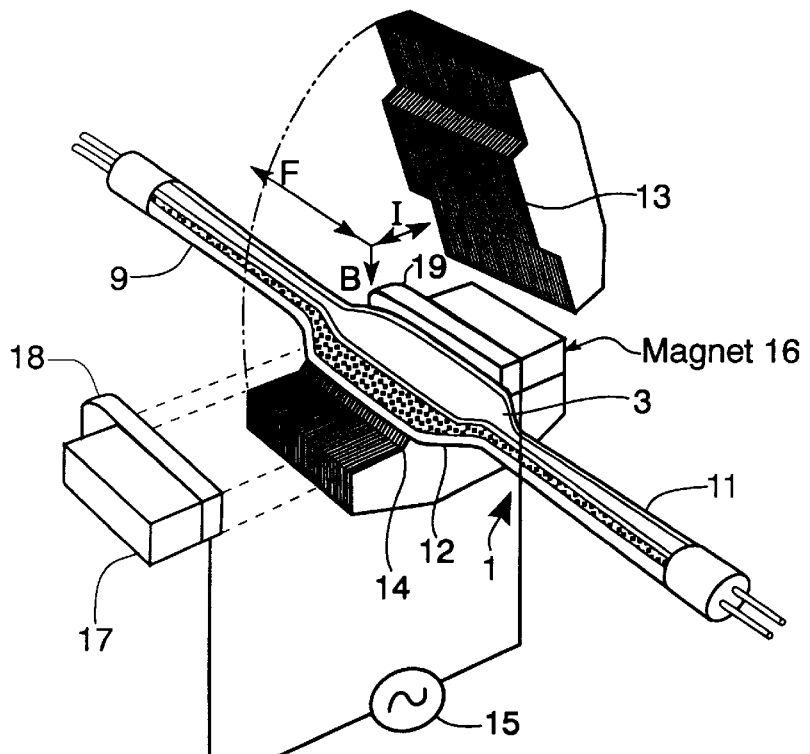

As shown in FIG. 1 and 2, a liquid gallium slug 3 is positioned between a first gas portion 2 and a second gas portion 4 within a duct 1. Conventional pairs of check valves 6 and 8 function in the manner well known to workers in the art to provide the cooler with compressed working fluid such as helium gas. Duct 1 comprises cylindrical portions 9 and 11 at opposite ends of a flattened central portion 12 as shown. The cylinders can thus be described as tapered cylinders which provide a flattened portion between the magnetic pole pieces 13 and 14. Tile flux for the pole pieces are provided by permanent magnets 16 and 17. A pair of electrodes 18 and 19 are electrically coupled to the liquid gallium slug and straddle the central chamber portion 12, and are connected to a source of alternating, current 15, producing an alternating current I through, the liquid gallium slug, perpendicular to the magnetic field B as shown in FIG. 2. This produces a force F for driving the liquid gallium slug or piston back and forth in step with the AC current fluctuations applied to the electrodes 18 and 19. Thus, the interaction between the alternating current through the gallium slug produced by the electrodes and the magnetic field generates alternating forces F on the liquid slug normal to the current and field vectors, and the slug reciprocates back and forth at the same frequency of the input current, preferably at 10–50 Hz, enabling compression of the working fluid. Hence, the motion of the liquid gallium slug is used to alternately compress the working fluid, which can be helium gas, and drive the gas intake in both end portions of the compressor duct via the aforesaid check valves.

Figure 3:
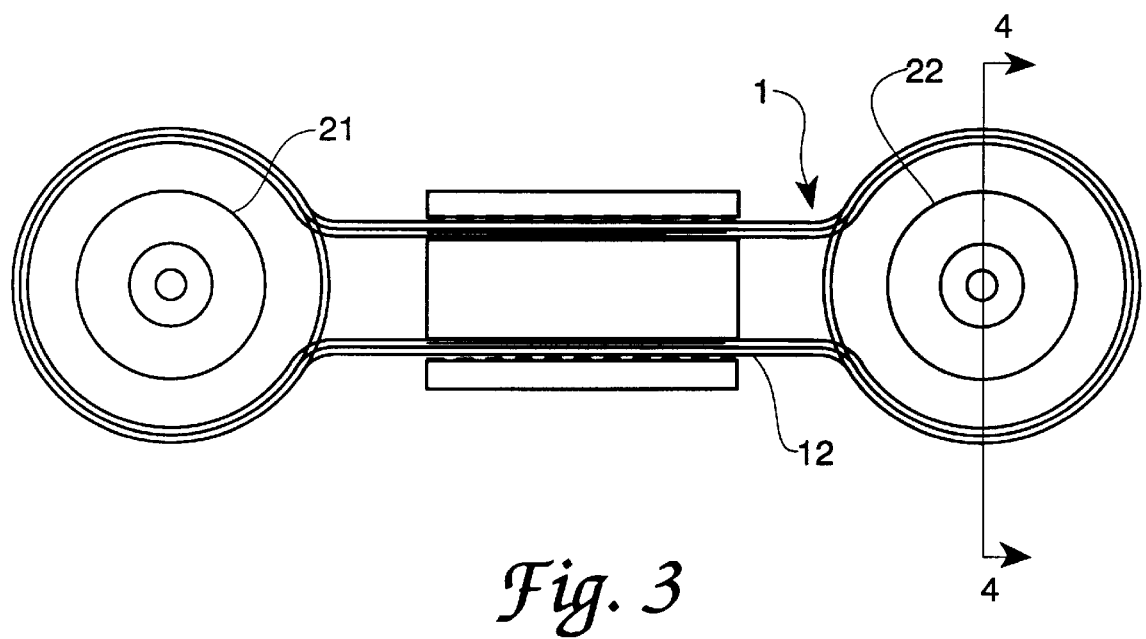
FIGS. 3 and 4 illustrate a pair of diaphragms which may be added to separate the liquid gallium slug from the working fluid.
Figure 4:
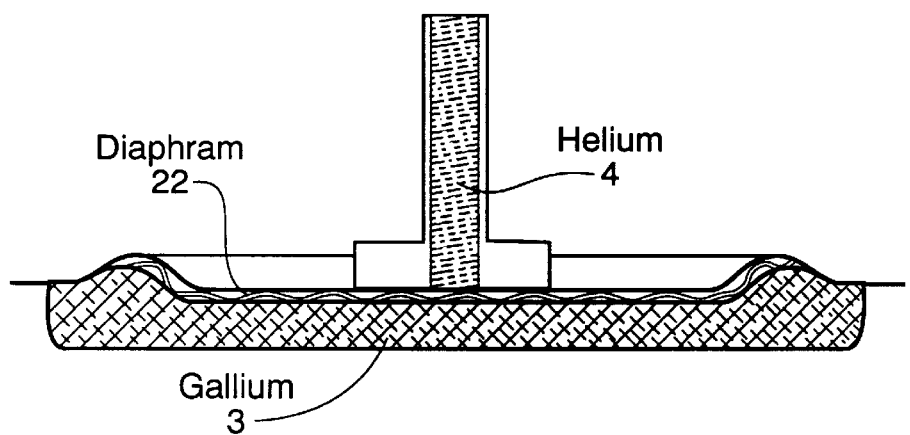

Because of the extremely low vapor pressure of the electrically conductive gallium at room temperature, namely about $10^{-19}$ torr, it is possible to have direct contact between the gallium liquid piston slug and the gas without contaminating the working fluid. Such a liquid piston would also allow tailoring of the compressor heads to minimize dead volume and maximize the pressure ratio in the compressor. However, because of possible difficulties of managing the gallium/gas interface, it may be better to provide thin metal diaphrams 21 and 22 shown in FIGS. 3 and 4 between the gallium and the working, as which could be helium. The diaphragms are hydraulically loaded and the pressure difference across them is only that required to deflect the diaphragms. This is a very benign operating mode when compared to mechanically driven diaphragm compressors, and the diaphragms will not introduce additional reliability concerns. In fact, a diaphragm compressor version of the invention would be more reliable than a free surface compressor version because it eliminates potential failure due to contamination of the gallium-gas interface. The diaphragms also simplify the control of the compressor because they preclude any possibility of over-stroking the compressor and introducing gallium into the check valves. Thus, the diaphrams act as means for isolating the gallium slug from the gas while transmitting compressive forces thereto.

The compressor can achieve high pressure ratios in a single stage. The liquid gallium slug driving force can be increased by increasing the current, and acceptable current densities can be maintained by lengthening the channel, a prototype compressor achieved a pressure ratio of three with a channel of only 2.5 cm in length. Because of this high pressure ratio, fewer compressor stages would be required to achieve the optimum operating pressure ratios for J-T coolers. In summary, the compressor of the invention can resolve size, performance and reliability requirements particularly for use in closed cycle J-T systems for sensor cooling applications.

As variations in the foregoing will occur to workers skilled in the art, the scope of the invention is to be restricted solely by the terms of the claims and art recognized equivalents thereof. For example, the compressor could be used without check valves in miniature Stirling or pulse-tube cryocoolers, and the gallium Slug could contain varying percentages of indium to reduce its melting point temperature.

What is claimed is:

1. A compressor comprising:
   (a) a duct having two working fluid portions and a slug containing portion positioned therebetween containing a liquid slug of an electrically conductive substance;

(b) magnetic field producing means for passing a magnetic field through said liquid slug in a first direction; and (c) current generating means for causing an alternating current to pass through said liquid slug in a second direction transverse to said first direction for in turn causing said liquid slug to move back and forth within said slug containing portion in a third direction, transverse with respect to said first and second directions, at a frequency of the alternating current thus enabling compression of said working fluid.

2. The compressor of claim 1 further including inlet and discharge check valve means in communication with said working fluid portions.

3. The compressor of claim 1 further including force transmission means positioned between said liquid slug and said working fluid for transmitting forces from said liquid slug to said working fluid while isolating said slug and said working fluid from each other.

4. The compressor of claim 3 wherein said force transmitting means comprises a diaphragm.

5. The compressor of claim 1 wherein said said liquid slug comprises an electrically conductive fluid having a low vapor pressure.

6. The compressor of claim 3 wherein said said liquid slug comprises an electrically conductive fluid having a low vapor pressure.

7. The compressor of claim 4 wherein said said liquid slug comprises an electrically conductive fluid having a low vapor pressure.

8. The compressor of claim 5 wherein said liquid slug comprises liquid gallium.

9. The compressor of claim 6 wherein said liquid slug comprises liquid gallium.

10. The compressor of claim 7 wherein said liquid slug comprises liquid gallium.

11. A compressor comprising:
(a) a duct having a working fluid portion and a liquid slug containing chamber portion containing a liquid slug of an electrically conductive substance capable of compressing said working fluid;
(b) magnetic field producing means for passing a magnetic field through said liquid slug; and
(c) current generating means for causing an alternating current to pass through said liquid slug and interact with said magnetic field to in turn cause said liquid slug to move back and forth, enabling compression of said working fluid.

12. The compressor of claim 11 further including force transmission means positioned between said liquid slug and said working fluid for transmitting forces from said slug to said working fluid while isolating said slug and said working fluid from each other.

13. The compressor of claim 12 wherein said force transmitting means comprises a diaphragm.

14. The compressor of claim 11 wherein said said liquid slug comprises an electrically conductive fluid having a low vapor pressure.

15. The compressor of claim 12 wherein said liquid slug comprises an electrically conductive fluid having a low vapor pressure.

16. The compressor of claim 13 wherein said liquid slug comprises an electrically conductive fluid having a low vapor pressure.

17. The compressor of claim 14 wherein said liquid slug comprises liquid gallium.

18. The compressor of claim 15 wherein said liquid slug comprises liquid gallium.

19. The compressor of claim 16 wherein said liquid slug comprises liquid gallium.

20. The compressor of claim 11 having means to reciprocate said liquid slug.

21. A compressor comprising:
(a) a duct having a flattened slug containing portion containing a liquid slug comprising gallium and at least one working fluid portion;
(b) magnetic field producing means including a pair of pole pieces positioned adjacent said flattened portion of said duct for passing a magnetic field through said liquid slug in a first direction; and
(c) current generating means for causing an alternating current to pass through said liquid slug in a second direction substantially perpendicular to said first direction for causing said liquid slug to move back and forth within said slug containing portion in a third direction, substantially perpendicular respect to said second direction, at a frequency of the alternating current thus enabling said liquid slug to act as a piston for compressing said working fluid.

* * * * *